Sept. 24, 1968   G. G. W. THOM   3,403,018
METHOD OF TREATING PRECIPITATOR DUST
Filed Aug. 31, 1965   2 Sheets-Sheet 1

INVENTOR.
GENE G. W. THOM
BY
Arne T. Fors
Agent

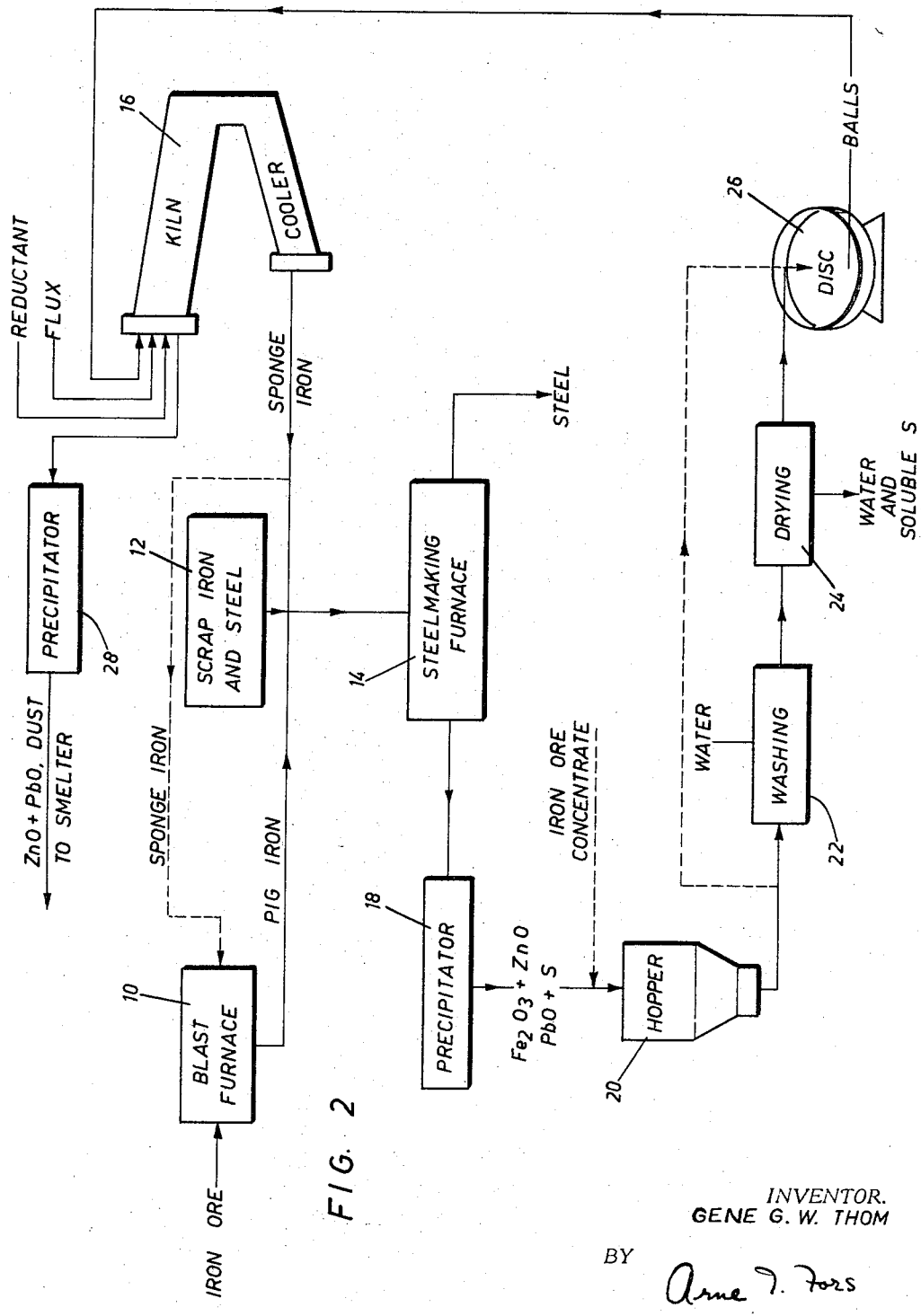

United States Patent Office 3,403,018
Patented Sept. 24, 1968

3,403,018
METHOD OF TREATING PRECIPITATOR DUST
Gene Gee Wing Thom, Hamilton, Ontario, Canada, assignor to The Steel Company of Canada, Limited, Hamilton, Ontario, Canada, a Canadian company
Filed Aug. 31, 1965, Ser. No. 483,919
11 Claims. (Cl. 75—25)

ABSTRACT OF THE DISCLOSURE

Sponge iron is produced from precipitator dust from steel furnaces, which dust contains iron oxide and zinc and lead values, by pelletizing the dust and heating the pellets in a reducing atmosphere in the presence of particulate carbonaceous material and flux at a temperature sufficiently high to reduce the iron oxide to sponge iron and to vaporize the zinc and lead values.

---

This invention relates to a method of treating precipitator dust from industrial furnaces and is particularly directed to an improved method for the production of sponge iron and separation and recovery of non-ferrous metal values by direct reduction of precipitator dust from steelmaking furnaces.

Dust from open hearth furnaces, for example, presents a serious disposal problem in metallurgical operations in that the considerable tonnage of dust of fine particle size recovered by precipitators, largely in the form of iron oxide, normally contains zinc oxide, lead oxide and sulphur compounds in quantities which prohibit recovery of the iron values by conventional iron and steelmaking processes. Techniques for the reclamation of precipitator dust including electrostatic, hydrometallurgical and pyrometallurgical methods have generally proven unsatisfactory. Sintering of the dust to produce a blast furnace feed, for example, while significantly lowering the sulphur, zinc oxide and lead oxide contents of the dust, does not sufficiently eliminate these deleterious constituents to permit charging of the dust-sinter product into blast furnaces. Thus, many tons of dust containing significant iron, zinc, lead and sulphur values must be transported to and discarded, daily, in waste dumps.

I have discovered that the water washing and pelletizing of fine precipitator dust to form "green balls" and the direct reduction of the green balls in a rotary kiln according to the process decsribed in Canadian Patent No. 654,017 issued Dec. 14, 1962 substantially eliminates up to about an average of 95% of contained zinc and lead oxides and up to about 80% of contained sulphur while producing a high quality sponge iron suitable for subsequent treatment in conventional iron and steelmaking processes. Substantially all zinc and lead oxides eliminated during reduction can be separately recovered from the exhaust gases.

It is a principal object of the present invention, therefore, to provide a method of recovering and utilizing iron values from precipitator dust from steelmaking furnaces by the production of high quality sponge iron suitable for feeding to conventional iron and steelmaking processes.

It is another object of the present invention to provide a method for the concurrent elimination of the lead, zinc and sulphur values in the precipitator dust.

A further object of the present invention is the provision of a method for the recovery of the iron and non-ferrous metal values in precipitator dust which is simple, reliable and economic in operation and which permits utilization of dust which heretofore has been discharged to waste.

These and other objects of the present invention, and the manner in which they can be attained, will become apparent from the following detailed description of the drawings, in which:

FIGURE 2 is a flowsheet illustrating the process of the present invention employed in a steelmaking system.

Like reference characters refer to like parts throughout the description of the invention and the drawings.

Figure 1:
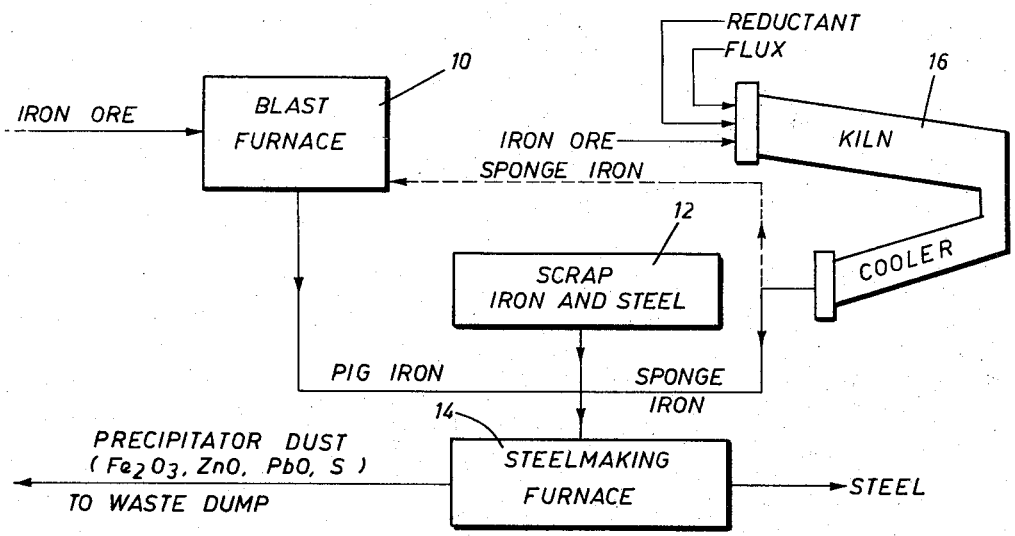
FIGURE 1 is a flowsheet of a conventional steelmaking process illustrating the possible utilization of direct reduction techniques for providing sponge iron.

With reference now to the accompanying drawings, FIGURE 1 schematically illustrates a conventional steelmaking process wherein pig iron from blast furnace 10, together with scrap iron and steel designated by numeral 12, are fed to the open hearth or the like steelmaking furnace 14. Steel is withdrawn from furnace 14 as product and certain impurities, such as zinc and lead values normally in oxide form and sulphur as a complex compound, together with valuable iron oxide values, are discharged in the furnace exhaust gases. These substances escape from the furnace as particles of dust normally finer than about 0.04 mm. in size and are precipitated from the exhaust gases, collected, and discharged to waste. The use of a direct reduction stage 16 for the production of sponge iron for feed to the steelmaking furnace is also known, the direct reduced sponge iron being added to the pig iron and scrap iron and steel which constitute the charge to the furnace.

FIGURE 2 of the drawing illustrates the process of the present invention wherein the precipitator dust recovered from the exhaust gases from the open hearth furnace by precipitator 18 is fed to a hopper 20, preferably to washing and drying steps 22 and 24 for elimination of a portion of water soluble sulphur compounds, and to a pelletizing disc 26 with about 1% by weight of a binding agent such as bentonite and about 4% to about 8% moisture for production of green balls within the size range of from about 3 mm. to about 15 mm. The green balls are then conveyed to rotary kiln 16 and charged to and conveyed through said kiln with a solid reductant such as anthracite coal in the size range of from about 0.15 mm. to about 12 mm. and a flux such as dolomite in the size range of from about 0.5 mm. to about 3 mm. at a temperature in the range of from about 1000° to about 1200° C. in an atmosphere of reducing gases flowing counter-current to the passage of the solid reactants. The iron oxide constituent of the green balls is reduced to a highly metallized sponge iron product and substantially all the zinc and lead oxides are reduced, volatilized and discharged from the kiln in the exhaust gases for subsequent recovery by precipitator 28. A substantial portion of the sulphur content of the green balls is liberated and either combined with the flux or discharged with the exhaust gases. The sponge iron, after separation from the sulphur containing flux and remaining solid reductant, can be briquetted or recharged directly to the steelmaking furnace 14 or blast furnace 10 to provide a closed steelmaking cycle.

The operation of the method of the present invention will now be discussed in more detail with reference to the following example relating to the treatment of an open hearth precipitator dust containing an average of 64.2% Fe, 0.94% $SiO_2$, 0.18% $Al_2O_3$, 0.75% MgO, 1.14% CaO, 1.32% ZnO, 0.40% BbO and 5.53% S wherein the ZnO, PbO and S constituents of the dust treated ranged from 0.51% to 9.41%, 0.31% to 0.58% and 0.40% to 0.66%, respectively. Screen analyses of the dust indicated that substantially all the dust was finer than 0.04 mm. in size.

The precipitator dust blended with 1% bentonite and 4% to 8% water was pelletized to produce green balls substantially within the size range of from about 3 mm.

to about 15 mm. which were charged at a rate of about 80 tons per day (t.p.d.) to a rotary kiln with 40 t.p.d. of "Buckwheat No. 4" anthracite coal within the size range of from about 0.15 mm. to about 12 mm. and 2.4 to 4.0 t.p.d. of a dolomite flux substantially within the size range of from about 0.5 mm. to about 3 mm. The anthracite coal was supplied in an amount which provided about 70% of the total fuel energy required for reduction of the iron content of the green balls, maintaining the kiln at the desired reaction temperature, and permitting the discharge of solid reductant with the product sponge iron. The remaining 30% of the fuel energy required to complete the reaction was supplied by the introduction into the kiln at spaced intervals along its length of natural gas, together with air necessary to permit combustion. The temperature of the reducing zone of the kiln was maintained at from about 1000° C. to about 1200° C.

The following table illustrating test data from two trial runs particularly shows the degree of reduction of the iron constituent and percentage elimination of zinc, lead and sulphur values from the pelletized precipitator dust:

TABLE I

| Test No. | Temp., °C. | Degree of reduction, percent | Analysis of green ball, percent | Analysis of sponge iron, pellet, percent | Elimination, percent |
|---|---|---|---|---|---|
| 1 | 1,050 | 96.4 | $Fe_T$, 66.00 | $Fe_T$, 91.00 | |
| | | | $Fe^{++}$, 13.10 | $Fe_m$, 87.00 | |
| | | | ZnO, 0.82 | ZnO, 0.17 | ZnO, 85.0 |
| | | | PbO, 0.11 | PbO, 0.005 | PbO, 97.0 |
| | | | S, 0.36 | S, 0.22 | S, 55.8 |
| 2 | 1,100 | 99.9 | $Fe_T$, 62.70 | $Fe_T$, 90.40 | |
| | | | $Fe^{++}$, 2.00 | $Fe_m$, 90.30 | |
| | | | ZnO, 1.39 | ZnO, 0.058 | ZnO, 97.1 |
| | | | PbO, 0.16 | PbO, 0.006 | PbO, 97.6 |
| | | | S, 0.58 | S, 0.16 | S, 81.5 |

It will be evident from the foregoing table, wherein "$Fe_T$" represents total iron and "$Fe_m$" represents metallized iron, that the direct reduction of pelletized precipitator dust according to the process of the present invention results in the production of highly metallized sponge iron substantially free of zinc, lead and sulphur values which is satisfactory for charging to iron and steelmaking vessels. Zinc and lead values eliminated from the sponge iron are carried away from the kiln in the exhaust gases, re-oxidized, and recovered from said exhaust gases in the form of dust which contains upwards of 50% ZnO and PbO, the balance being silicates, carbon and the like. This dust is suitable for processing in zinc and lead smelters.

It will also be evident from the foregoing table that a high degree of reduction is associated with substantial elimination and separation of zinc, lead and sulphur values from the sponge iron. In the example shown on Table 1, an increase in the degree of reduction from 96.4 to 99.6 percent further increased the zinc oxide elimination from 85 percent to 97.1 percent, lead oxide elimination from 97.0 to 97.6 percent and sulphur elimination from 55.8 to 81.5 percent. Unless a substantial amount of zinc, lead and sulphur values are eliminated, the sponge iron would not be satisfactory for charging to iron and steelmaking vessels.

The water washing and drying steps 22 and 24 can be by-passed if the presence of sulphur in the sponge iron product is not critical. Deletion of the water washing and drying steps results in the production of sponge iron having a relatively high sulphur content of about 0.1% as compared to a sponge iron having a sulphur content of less than 0.05%.

It will be understood that the provision of solid reductant and supplemental fuel introduced along the length of the kiln is controlled whereby the carbon content of the coal is supplied in an amount which provides from about 50% to about 90% of the total fuel energy required for reduction of the iron content of the pellets and maintaining the kiln at the desired reaction temperature, and which permits the discharge with the reacted charge mixture of from about 0.05 pound to about 0.5 pound of carbon per pound of iron oxide charged; and the supplemental fuel is supplied in an amount which provides the balance of from about 50% to about 10% of the remaining fuel energy requirements. Air is added with the supplemental fuel at spaced intervals along the kiln length in an amount which provides sufficient oxygen to combust all the supplemental fuel and at least 20% of the solid carbonaceous material for supplying the necessary heat and reducing gases required for the reaction.

It will also be understood that the foregoing description and example of the process of the present invention is not restricted to the treatment of open hearth dust alone but is also intended to encompass the treatment of dust mixed with iron bearing materials such as ore concentrates. I have found, for example, that the mixing of precipitator dust with fine magnetite (Hilton concentrate) and with fine specular hematite (Wabush concentrate) wherein the concentrates are 80% minus 0.043 mm. in size permits the production of green balls having uniformly high compression strengths adequate for passage through a rotary kiln with reduced degradation relative to green balls formed from the said concentrates having no flue dust or binding agent mixed therewith.

Table II shows the compression strengths of Hilton concentrate and open hearth precipitator dust having 1% of a binding agent and mixtures of the concentrate and dust. It was found that green balls produced from 99% precipitator dust and 1% bentonite had a maximum dry compression strength equivalent to about twice the strength of balls produced from 99% Hilton concentrate and 1% bentonite. Balls produced from dust having no bentonite had a compression strength adequate for passage through a rotary kiln with a minimum of degradation. However, where variations in the moisture content of the dust charged to the pelletizer occurred, the presence of up to 1% bentonite was found to stabilize the balling operation.

TABLE II

Dry compression strength lb./green ball

Composition of green ball:
- 100% Hilton concentrate _____ 8.0
- 99% Hilton concentrate, 1% bentonite _____ 25.0
- 40% open hearth dust, 60% Hilton concentrate _____ 40.4
- 60% open hearth dust, 40% Hilton concentrate _____ 46.5
- 99% open hearth dust, 1% bentonite _____ 49.0

Figure 3:
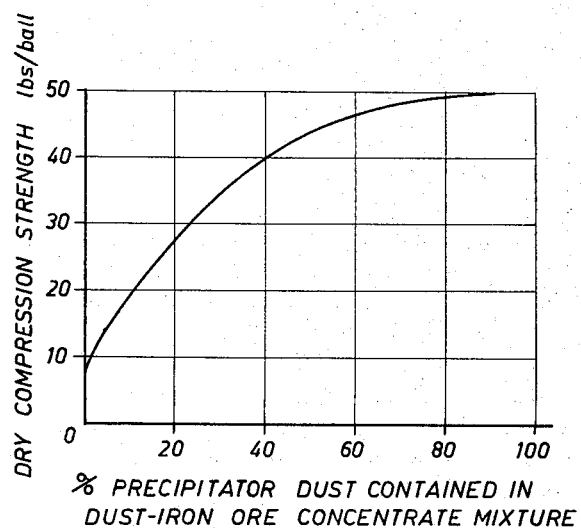
FIGURE 3 is a graph illustrating compressive strengths of green balls produced according to the process of the present invention.

FIGURE 3 illustrates graphically the effect of mixing open hearth precipitator dust with the fine Hilton concentrate on compression strengths of the green balls. It will be noted that balls produced from the Hilton concentrate having no bentonite had a compression strength of about 8 pounds which was inadequate for passage through a rotary kiln. The mixing of magnetite concentrate with at least 20% dust permitted the production of green balls having adequate compression strengths for passage through a rotary kiln.

A similar effect from dust additions to ore concentrate was observed with fine specular hematite in the same size range as the fine magnetite. Coarse ore concentrate such as specular hematite (Quebec Cartier concentrate) wherein the concentrate is 64% plus 0.42 mm. in size required greater additions of dust. The mixing of coarse specular hematite with at least 50% dust permitted the production of green balls having 26 pound compression strength, adequate for passage through the rotary kiln.

It was found however, that maximum reduction and metallization of iron values, maximum elimination of zinc and lead values, and minimum degradation of the green balls were unexpectedly obtained from the direct reduction of pelletized flue dust having up to about 1% of a binding agent.

It will be understood, of course, that modifications can be made in the preferred embodiments of the process described and illustrated herein without departing from the scope and purview of the invention as defined by the appended claims.

What I claim as new and desire to protect by Letters Patent of the United States is:

1. A process for the production of sponge iron and separation and recovery of zinc and lead values from dust containing iron oxide and zinc and lead values and substantially free from carbonaceous material and flux which comprises pelletizing the said dust to form balls, feeding said balls through a reduction zone of a rotary kiln at a temperature in the range of from 1000° C. to 1200° C. in an atmosphere of a reducing gas and in the presence of a particulate carbonaceous solid reductant and a particulate flux for reduction of said iron values to sponge iron and volatilization of said zinc and lead values, and separately withdrawing the solid reactants containing sponge iron substantially free of zinc and lead values and exhaust gas containing zinc and lead values from the rotary kiln.

2. In a process as claimed in claim 1, the reduction of the iron oxide to metallic sponge iron being from about 96 percent to 99.9 percent.

3. In a process as claimed in claim 1, water washing and drying said dust prior to the pelletizing step for the elimination of a portion of any water soluble sulphur compound.

4. In a process as claimed in claim 1, said reductant being coal in the size range substantially from about 0.15 mm. to about 12 mm. and said flux being dolomite larger than about 0.5 mm. in size.

5. In a process as claimed in claim 4, said flux being dolomite in the size range of from about 0.5 mm. to about 3 mm.

6. In a process as claimed in claim 1, said balls being larger than about 3 mm. in size.

7. In a process as claimed in claim 6, said balls being in the size range of from about 3 mm. to about 15 mm.

8. In a process as claimed in claim 1, said dust being mixed with up to about 80 percent of iron ore concentrate to form balls.

9. In a process as claimed in claim 1, said reductant being coal whose fixed carbon content provides at least 50% of the total fuel energy required for reduction of the iron oxide content of the balls and maintaining the kiln at the desired reaction temperature for the discharge of carbon with the reacted sponge iron in an amount of from about 0.05 pound to about 0.5 pound of carbon per pound of iron oxide charged, and supplying supplemental fuel in an amount which provides up to 50 percent of the remaining total fuel requirement.

10. In a process as claimed in claim 9, said supplemental fuel being volatile matter arising from the coal, and fluid fuel injected at spaced intervals along the length of the said rotary kiln.

11. In a process as claimed in claim 1, adding up to about 1 percent of a binding agent to said dust prior to the pelletizing step.

References Cited
UNITED STATES PATENTS

| | | | |
|---|---|---|---|
| 1,847,179 | 3/1932 | Genter | 75—25 |
| 2,257,710 | 9/1941 | Archibald | 75—25 |
| 2,373,244 | 4/1945 | Holz | 75—25 |
| 2,780,536 | 2/1957 | Carney | 75—25 |
| 3,003,864 | 10/1961 | Kraner et al. | 75—3 |
| 3,029,141 | 4/1962 | Sibakin et al. | 75—34 |
| 3,169,054 | 2/1965 | Werner | 75—25 |
| 3,219,436 | 11/1965 | Heitmann et al. | 75—3 |
| 3,235,375 | 2/1966 | Meyer et al. | 75—34 |
| 3,262,771 | 7/1966 | Ban | 75—25 |

BENJAMIN HENKIN, *Primary Examiner.*